United States Patent [19]

Sakai

[11] Patent Number: 5,663,558
[45] Date of Patent: Sep. 2, 1997

[54] OPTICAL BEAM SCANNING UNIT WITH SLIT FOR PRODUCING HORIZONTAL SYNCHRONIZING SIGNAL

[75] Inventor: Toshio Sakai, Nagoya, Japan

[73] Assignee: Brother Kogyo Kabushiki Kaisha, Aichi-ken, Japan

[21] Appl. No.: 498,774

[22] Filed: Jul. 5, 1995

[30] Foreign Application Priority Data

Jul. 7, 1994 [JP] Japan ................................. 6-156279
Jul. 7, 1994 [JP] Japan ................................. 6-156280

[51] Int. Cl.$^6$ ................................................. H01J 3/14
[52] U.S. Cl. ................................. 250/234; 359/196
[58] Field of Search ........................... 250/234–236, 250/201.2–201.5, 548, 237 R, 237 G; 356/400–402; 347/250, 235, 236, 241; 359/503–506, 212, 196

[56] References Cited

U.S. PATENT DOCUMENTS 4,404,571  9/1983  Kitamura .............................. 347/235
5,289,000  2/1994  Toyofuku ............................. 250/234
5,412,201  5/1995  Fukuzawa et al. .................... 250/234

FOREIGN PATENT DOCUMENTS

A-5-19194  1/1993  Japan.

*Primary Examiner*—Que Le
*Attorney, Agent, or Firm*—Oliff & Berridge

[57] ABSTRACT

A laser generation unit 20 emits a laser beam. A polygon mirror 27 deflects the laser beam to irradiate an image forming surface in horizontal scans. A beam detection mirror 25 reflects the laser beam at a start of each horizontal scan. A slit body 36 has a slit 44 oriented so the laser beam passes therethrough after being reflected off the mirror. A sensor 26 is disposed so that the laser beam falls incident thereon after passing through the slit 44. Light-obstructing walls 35a and 35b of the slit body 36 are slanted an appropriate angle with regards to an optical axis of the laser beam from the beam detection mirror 25. When reflected at the surfaces of the light-obstructing walls, the laser beam will not directly return to the beam detection mirror 25 and then to the polygon mirror 27. Any ghost images will not be formed on the image forming surface.

19 Claims, 7 Drawing Sheets

OPTICAL BEAM SCANNING UNIT WITH SLIT FOR PRODUCING HORIZONTAL SYNCHRONIZING SIGNAL

BACKGROUND OF THE INVENTION

1. Field of the Invention

The present invention relates to an optical beam scanning device and more particularly to the configuration of a slit mechanism for receiving a scanning optical beam and for producing a horizontal synchronizing signal.

2. Description of the Related Art

Japanese Patent Application Publication Kokai No. HEI-5-19194 describes an optical beam scanning unit (optical beam scanning device) for use in an electrophotographic image forming apparatus such as a laser printer, a copier, or a facsimile machine. The optical beam scanning unit includes: a laser unit for emitting a laser beam; a rotatable polygon mirror such as a hexagonal mirror for deflecting the laser beam; and a lens system for focusing the laser beam into a beam spot onto a subject medium thereby scanning the beam spot over the subject medium. These components are all encased in a box-shaped housing case.

The laser unit emits a laser beam modulated according to image data. The laser beam irradiates and reflects off the rotating polygon mirror. The reflected laser beam passes through the lens system and passes through a long and narrow window formed in one side of the housing case and converges on the surface of the medium to be scanned. The incident laser beam scanningly irradiates the medium in one scanning line by one surface of the polygon mirror.

A write start beam detecting unit is provided to the optical beam scanning unit for detecting a write start timing at which writing with the laser beam of one scanning line starts on the subject medium. The write start beam detecting unit includes: a write start beam detection mirror; a slit body; an optical fiber; and a photosenser. While being deflected by one surface of the polygon mirror, the laser beam first reaches the write start beam detection mirror and then starts forming a scanning line on the subject medium. When reaching the write start beam detection mirror, the laser beam reflects off the write start beam detection mirror and then passes through a thin slit formed in the slit body to fall incident on the optical fiber. The laser beam is guided by the optical fiber to the photosensor which is positioned at the opposite end of the optical fiber. Upon receiving the laser beam, the photosensor produces a write start beam detection signal. The laser unit will be modulated by the image data in synchronization with the write start beam detection signal. Thus, the write start beam detection signal is used as a horizontal synchronization signal.

The slit body is constructed from a pair of light-obstructing walls that form the left and right sides of the slit. The light-obstructing walls have planer surfaces orthogonal to the optical axis of the laser beam reflected from the write start beam detection mirror. Light directed toward and incident on the slit body partly reflects off the planer surfaces of the light-obstructing walls back to the polygon mirror via the write start beam detection mirror. After reflecting off of and being deflected by the polygon mirror, the laser beam will travel through the lens system to irradiate the surface of the medium to be scanned. Because this light converges on the surface of the medium, undesired ghost images such as black lines are formed in the image forming region of the subject medium.

To prevent interference caused when light reflected off of the write start beam detection mirror toward the photosensor intersects in the housing case with scanning light for forming an image on the surface of the subject medium, or when the scanning light reflects off the slit body or the photosensor, the housing case must be made large to secure space for the write start beam detection mirror and the photosensor.

In order to adjust the write start timing, the slit body must be moved in a direction normal to the optical axis of the laser beam reflected from the write start beam detection mirror, i.e., in a direction parallel to the light-obstructing wall surface. However, thus moving the slit body in a direction normal to the optical axis of laser light requires a large housing case with space enough for such movement. A large housing case, however, is undesirable.

In order to move the slit body in the direction orthogonal to the optical axis of laser light from the write start beam detection mirror, a contrivance such as forming a guide groove parallel to the direction of movement is necessary. Even when such a contrivance is provided, minute adjustments are still difficult.

SUMMARY OF THE INVENTION

It is an objective of the present invention to provide a compact optical beam scanning device capable of forming images on a subject medium without generation of ghost images and wherein adjustment of the write start position is simple.

In order to achieve the above objective and other objectives, the present invention provides an optical beam scanning device comprising: a light source emitting a laser beam; a deflection unit deflecting the laser beam to irradiate an image forming surface in horizontal scans; a mirror reflecting the laser beam at a start of each horizontal scan; a slit body having a light-obstructing wall for defining a slit oriented so the laser beam passes therethrough after being reflected off the mirror, the light-obstructing wall being slanted with regards to an optical axis of the laser beam reflected from the mirror; and a sensor disposed so that the laser beam falls incident thereon after passing through the slit, the sensor producing a horizontal scan start timing signal upon receiving the laser beam.

When the deflection unit, the slit body, and the sensor are encased in a housing, a partition wall may be provided for separating an optical path from the deflection unit to the mirror and an optical path from the mirror to the slit body.

It is preferable that the slit body may be rotatably mounted for adjusting the position of the slit in a direction perpendicular to the optical axis of the laser beam. The slit body may be rotatably mounted with its center of rotation for selectively cause the laser beam travelling along its optical axis adjacent to the center of rotation to fall incident on the slit.

When the light-obstructing wall extends toward an inner surface of an encasing wall of the housing case, a protrusion may be provided to the inner surface of the encasing wall so as to obstruct light passing between the light-obstructing wall and the encasing wall.

According to another aspect, the present invention provides an optical beam scanning device comprising: a light source emitting a laser beam; a deflection unit deflecting the laser beam to irradiate an image forming surface in horizontal scans; a mirror reflecting the laser beam at a start of each horizontal scan; a slit body having a light-obstructing wall for defining a slit oriented so the laser beam passes therethrough after being reflected off the mirror, the slit body being rotatably mounted for adjusting the position of the slit in a direction perpendicular to the optical axis of the laser beam from the mirror; and a sensor disposed so that the laser beam falls incident thereon after passing through the slit, the sensor producing a horizontal scan start timing signal upon receiving the laser beam.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
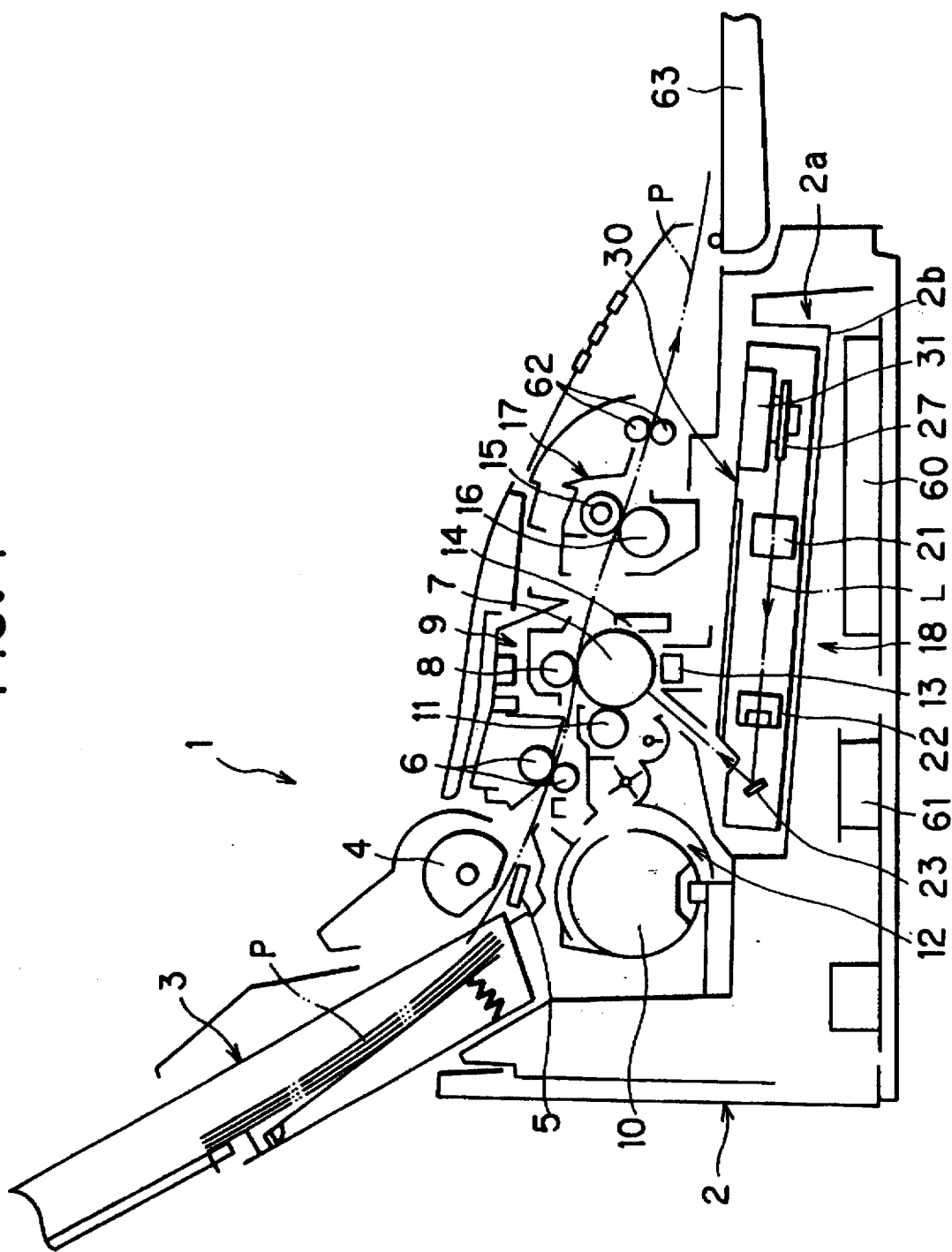
FIG. 1 is a cross-sectional view schematically showing an example of a laser beam printer employing an optical beam scanning unit of a preferred embodiment of the present invention.

An optical beam scanning device according to a preferred embodiment of the present invention will be described while referring to the accompanying drawings wherein like parts and components are designated by the same reference numerals to avoid duplicating description.

Figure 2:
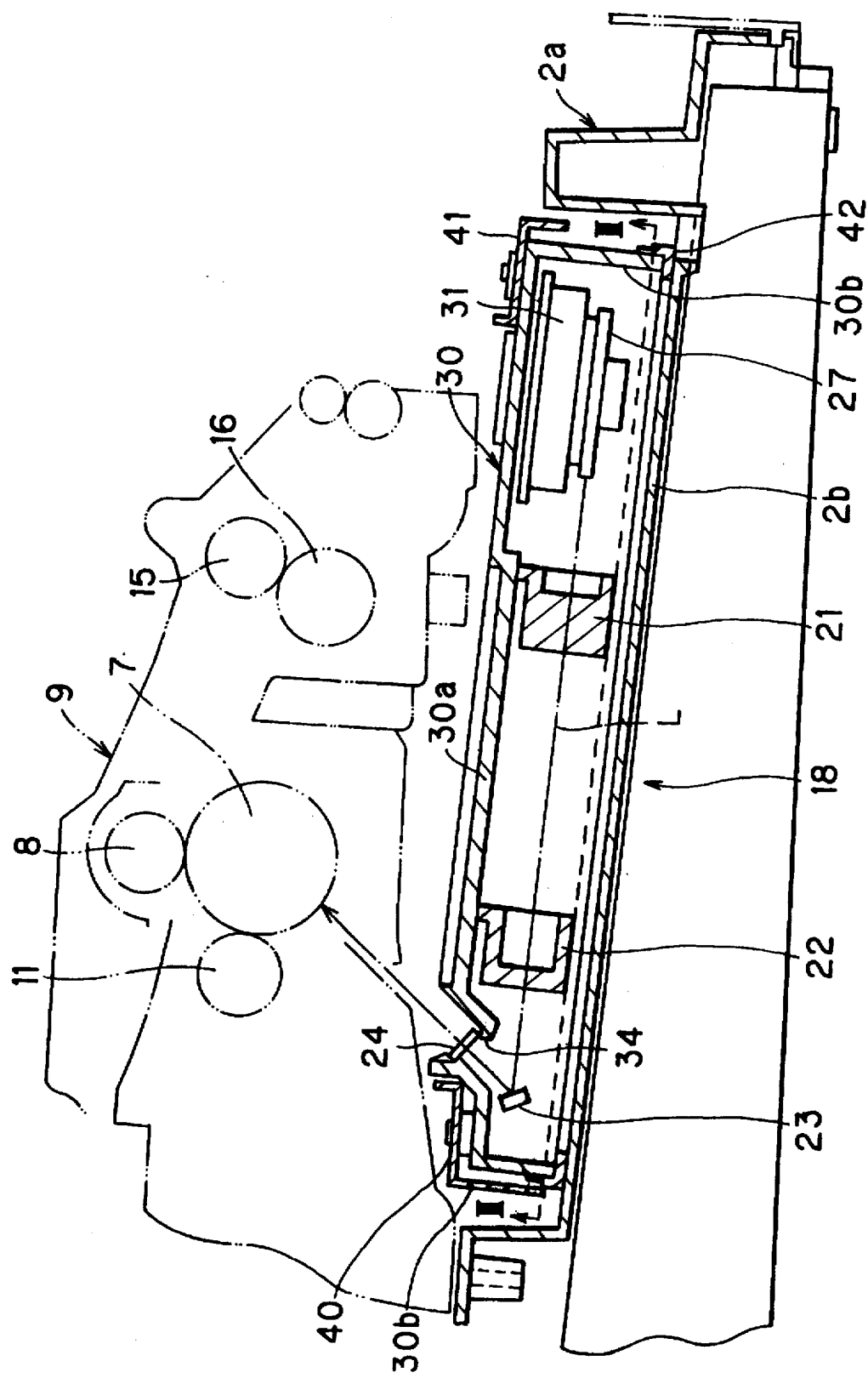
FIG. 2 is a cross-sectional view showing an optical beam scanning unit of the laser beam printer of FIG. 1.
Figure 3:
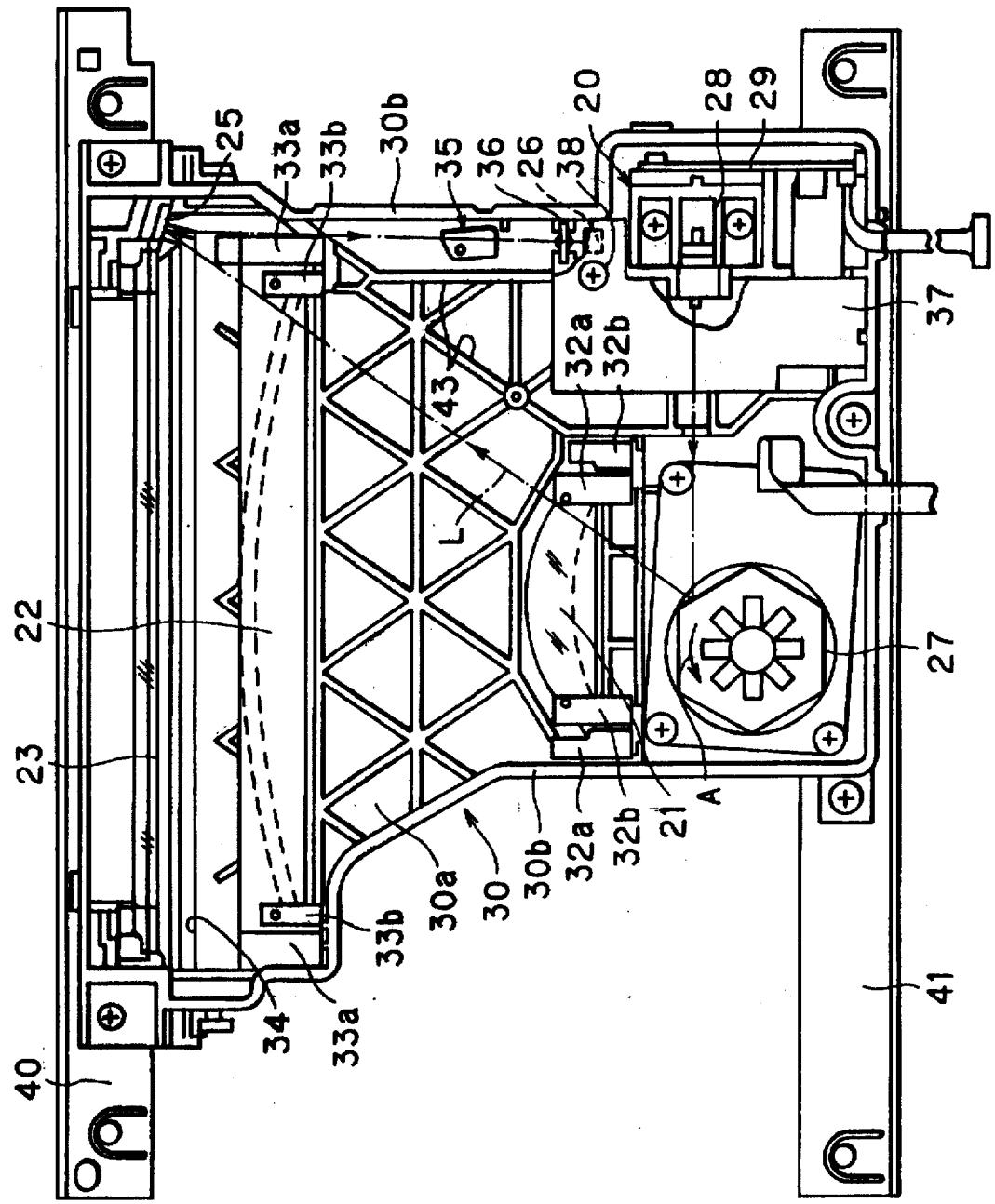
FIG. 3 is an underside cross-sectional view taken along line III—III of FIG. 2 showing positional relationship of components in a housing of the optical beam scanning unit of FIG. 2.

First, a laser beam printer 1 employing an optical beam scanning device according to the present embodiment will be described while referring to FIGS. 1 through 3. The printer 1 has a detachable sheet supply cassette 3 mounted at the upper side of the case 2. Sheets P serving as a recording medium are stacked in the sheet supply cassette 3. A sheet feed roller 4 and a separation pad 5 are provided for separating one sheet P at a time from the stack in the sheet supply cassette 3. A pair of rollers 6 takes the separated sheet P and supplies it to an image forming unit 9.

The image forming unit 9 is housed in the case as a single unit and includes a rotatable photosensitive drum 7 serving as a photosensitive body; a transfer roller 8 serving as a transfer means; a developing unit 12 having a developing roller 11 and a toner cartridge 10 positioned near the sheet supply cassette 3; a charge unit 13 disposed below the photosensitive drum 7; and a cleaning unit 14 disposed to the side of the photosensitive drum 7.

A fixing unit 17 having a pressure roller 15 and a thermal roller 16 is disposed at the sheet-discharge side of the image forming unit 9.

A scanning unit 18 is disposed below the image forming unit 9. The scanning unit 18 is an optical beam scanning device of the present embodiment for scanning the undersurface of the photosensitive drum 7 with laser light in a line parallel to the axis of the photosensitive drum 17 (i.e., in a horizontal scanning line). A housing case 30 of the scanning unit 18 is formed into a box shape from plastic reinforced with glass fibers. The housing case 30 has an upper panel 30a. A downward facing opening is formed in the housing case 30. The housing case 30 is mounted on the upper surface of a panel portion 2b of a main frame 2a in the case 2 by resting on a seal material 42 such as sponge rubber. Reinforcing plates 40 and 41 detachably fix the upper panel 30a of the housing case 30 to the left and right sides of the main frame 2a.

In a manner to be described later, the scanning unit 18 serves to emit a laser beam that converges on the surface of the photosensitive drum 7. Because a uniform charge has been formed on the surface of the photosensitive drum 7 by the charge unit 13, the laser beam, which has been modulated according to image data transmitted from an external device, such as an external control device which is not shown in the drawings, forms a latent static image on the surface of the photosensitive drum 7. The latent static image is developed into a visible toner image by charged toner particles supplied by rotation of the developing roller 11. Afterward, the toner image is transferred onto the recording sheet P supplied to the transfer position between the photosensitive drum 7 and the transfer roller 8. Next, the sheet P with the toner image formed thereon is transported between the heat roller 16 and the pressure roller 15 of the fixing unit 17. Pressure and heat applied to the toner image fixes the toner image to the sheet P. The sheet P is then discharged onto a discharge tray 63 by a pair of discharge rollers 62.

A control board 60 and a high-voltage board 61 are disposed beneath the main frame 2a. The high-voltage board 61 is for applying high voltage to the transfer roller 8 and the charge unit 13.

Next, the scanning unit 18 will be described while referring to FIG. 2 through 8. The scanning unit 18 includes: a laser generation unit 20; a rotatable polygon mirror 27; a fθ lens 21; a cylindrical lens 22; a reflect-back mirror 23; a write start beam detection mirror 25; a slit body 35; a condenser lens 36; and a write start beam detection sensor 26 such as a photosensor. These components are all mounted on the undersurface of the upper panel 30a in the housing case 30.

The laser generation unit 20 serving as a light source is constructed from a semiconductor laser and a collimator lens, neither of which are shown in the drawings, housed in a block 28. The laser generation unit 20 is positioned at one corner of the housing case 30 far from the photosensitive drum 7 and fixed to the lower surface of the upper panel 30a by screws. A printed circuit board 29 is attached to the back surface of the block 28. The printed circuit board 29 is connected to the external control device for receiving the image data from the external control device.

Figure 4:
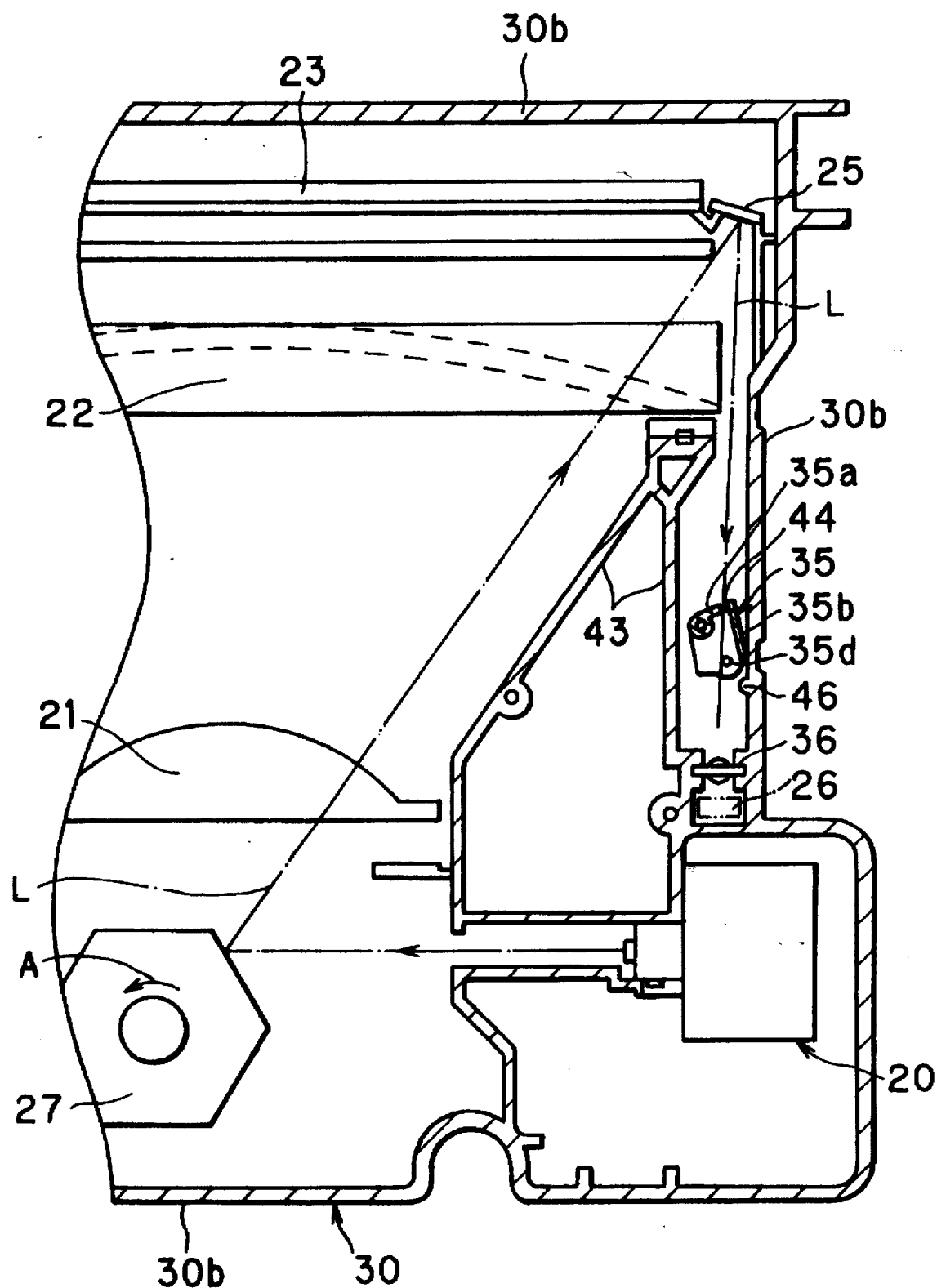
FIG. 4 is a cross-sectional view along a plane parallel to the underside surface of the upper panel 30a illustrating an essential part thereof.

A drive motor 31 for rotating the polygon mirror 27 in the direction indicated by the arrow A in FIG. 4 is fixed to the interior surface of the upper panel 30a. The laser generation unit 20, the polygon mirror 27, and the photosensitive drum 7 are oriented so that the laser beam falling incident on the polygon mirror 27 from the laser generation unit 20 has an optical axis substantially parallel to the axis of rotation of the photosensitive drum 7. The fθ lens 21 and the cylindrical lens 22 are disposed in the optical path of the laser beam L deflected by the mirror surfaces of the polygon mirror 27.

The fθ lens 21 is fixed at either ends to the upper panel 30a by fasteners 32a and 32b made from plate springs. The cylindrical lens 22 is also fixed at either ends to the upper panel 30a by fasteners 33a and 33b also made from plate springs. The reflect-back mirror 23 is disposed to reflect the laser beam L after exiting from the cylindrical lens 22 upwardly toward the lower surface of the photosensitive drum 7. A slit-shaped opening 34 is formed in the upper panel 30a of the housing case 30 running parallel to the axis of rotation of the photosensitive drum 7 at a position in close proximity to the lower surface of the photosensitive drum 7. A cover plate 24 formed from a light-transmitting material such as glass covers the slit-shaped opening 34. The laser beam L deflected by the polygon mirror 27 passes through the cover plate 24 and scans, following the axial direction of the photosensitive drum 7, across the lower surface of the photosensitive drum 7. Thus, the laser beam L performs horizontal scans on the photosensitive drum 7.

The fθ lens 21 functions to converge an incident laser beam into a spot on the surface of the photosensitive drum 7 at a position away from the optical axis of the fθ lens 21 a distance that is proportional to the deflection angle θ defined between the optical axis of the fθ lens 21 and the laser beam reflected off of the polygon mirror 27.

The beam detector mirror 25 is positioned proximate to one end in the lengthwise direction of the reflect-back mirror 23. As the polygon mirror 27 rotates in the direction A of FIG. 3, each mirror surface of the polygon mirror 27 deflects the laser beam first toward the beam detector mirror 25 and then toward the reflect-back mirror 23. Accordingly, the laser beam falls incident on the beam detection mirror 25 immediately before starting each scan on the photosensitive drum 7.

The beam detection mirror 25 is fixed in that position by plate springs (not shown in the drawings). The beam detector mirror 25 is for reflecting off the incident laser beam toward the slit body 35. As shown in FIG. 3, the beam detection mirror 25, the slit body 35, the condenser lens 36 and the beam detection sensor 26 are arranged substantially in line. The mirror 25, the slit body 35, and the condenser lens 36 are positioned substantially on the optical axis of the condenser lens 36. With this positioning, when the laser beam passes through the slit body 35, the laser beam travels through the condenser lens 36 and falls incident on the beam detector sensor 26.

A partition wall 43 is provided for separating the optical path from the polygon mirror 27 to the beam detection mirror 25 and the optical path of light reflected from the beam detector mirror 25, transmitted through the slit body 35 and the condenser lens 36, and incident on the beam detector sensor 26. The partition wall 43 ensures that only the laser beam L reflected off of the beam detector mirror 25 is directed toward the slit body 35. The partition wall 43 prevents the laser beam L deflected by the polygon mirror 27 from being scattered by the interior surface of the encasing wall 30b to fall incident on the slit body 35, the condenser lens 36, or the beam detector sensor 26. In the present embodiment as depicted in the drawings, the partition wall 43 extends substantially parallel to the encasing wall 30b at one side of the housing case 30 (i.e., the right side of the housing case 30 in FIGS. 3 and 4).

Figure 5:
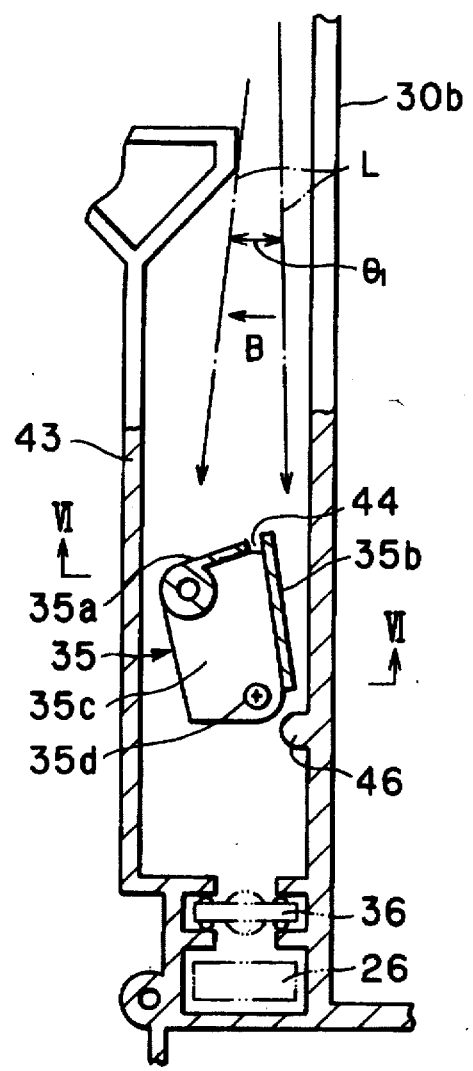
FIG. 5 is an enlarged view of an essential part of FIG. 4.
Figure 6:
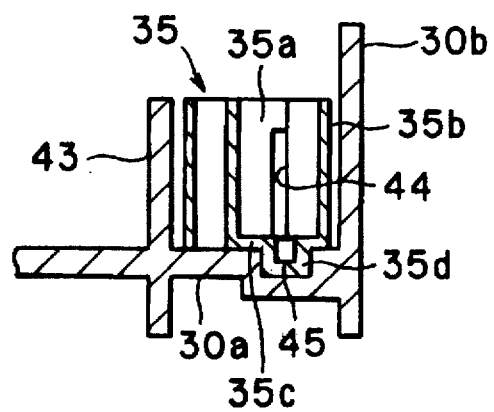
FIG. 6 is a cross-sectional view taken along line VI—VI of FIG. 5.

As shown in FIG. 5, the slit body 35 is formed from a composite resin material, for example, and is mounted to the inter surface of the upper panel 30a of the housing case 30. The slit body 35 includes a base 35c following the inner surface of the upper panel 30a. A boss 35d formed on the base 34c is fitted in a mounting depression 45 formed at the inner surface of the upper panel 30a. A light-obstructing wall of substantially L-shaped cross-section is provided to the base 35c. The light-obstructing wall extends substantially perpendicularly to the base 35c. The light-obstructing wall is constructed from a right and left side walls 35a and 35b, between which a narrow slit 44 is formed to extend also substantially perpendicularly to the base 35c.

The mounting depression 45 is provided to the inter surface of the upper panel 30a, at a position substantially on an optical axis of the condenser lens 36 that extends from the condenser lens 36 to the beam detection mirror 25. The slit body 35 is oriented so that the slit 44 is also positioned substantially on the optical axis of the condenser lens 36. With this positioning, the slit body 35 has the slit 44 at a position away from the cylindrical lens 22 by a distance equal to the distance between the cylindrical lens 22 and the surface of the photosensitive drum 7. Thus, the laser beam L from the beam detection mirror 25 is properly focused on the slit 44, whereby the laser beam is efficiently introduced to the condenser lens 36.

The photosensor 26 is positioned on the back side of the condenser lens 36. Laser light collected by the condenser lens 36 is introduced to the photosensor 26. The photosensor 26 produces a write start beam detection signal, upon receiving laser light of a predetermined amount or more.

With the above-described structure, the laser beam L emitted from the laser generation unit 20 reflects off the polygon mirror 27 and passes through the fθ lens 21 and the cylindrical lens 22. When the laser beam L is deflected by one surface of the polygon mirror 27 which is rotating in the direction A of FIG. 4, the laser beam first falls incident on the beam detector mirror 25 and then on the reflection-back mirror 23. While being incident on the beam detector mirror 25, the laser beam L reflected by the beam detection mirror 25 scans in the direction B of FIG. 5 from near the encasing wall 30b toward the partition wall 43 by a small angle θ1. When the laser beam L enters the boundaries of the slit 44 and falls incident on the slit 44 in focus, the laser beam L is efficiently introduced to the condenser lens 36. The condenser lens 36 collectively introduces the laser light to the photosensor 26. Because at this instance, laser light of an energy equal to or greater than the predetermined level falls incident on the beam detector sensor 26, the beam detector sensor 26 produces a write start beam detection signal.

According to the present invention, the orientation of the slit body 35 allows the surfaces of the left and right light-obstructing walls 35a and 35b to be at a slant to the optical axis of the laser beam L that scans by the angle θ1 in the direction B in FIG. 5. In other words, the walls 35a and 35b are oriented so that any lines extending perpendicularly from the walls 35a and 35b are not directed toward the mirror 25 but are directed toward the walls 43 and 30b, respectively. In addition, the walls 35a and 35b are oriented so that the edge surfaces of the walls forming the slit 44 are not oriented to reflect a too large amount of the laser beam L.

Though the orientation of the wall 35a is determined dependently on the shape of the separation wall 43, a line extending perpendicularly from the wall 35a is preferably shifted from a line extending from the wall 35a to the mirror 25 by an angle falling in a range of 5° and 60°. More preferably, the angle should fall in a range of 12.2° and 34.4°.

According to this structure of the slit body 35, the laser beam L reflected off of the surfaces of the walls 35a and 35b will not directly return to the beam detector mirror 25 and so will not be reflected off by the polygon mirror 27 again. Therefore, ghost images will not be formed on the image forming region at the surface of the photosensitive drum 7.

Even if the laser beam L returns from the walls 35a and 35b to the beam detector mirror 25, it will be after repeatedly scattered at the inner walls of the partition wall 43 and the housing case 30. This scattering attenuates the light energy about to 50% or less of its original energy. This residual energy is insufficient to form a latent image on the surface of the photosensitive drum 7 so that ghost images will not be produced so that good quality images can be obtained.

By thus forming the slit 44 in the light-obstructing walls 35a and 35b slanted at the appropriate angle to the optical axis of the incident laser beam L, the incident light will partly hit the edge corner portion of the slit 44 so that the rising edge of the beam detection signal will become sharper. A detection signal can be more accurately and stably obtained.

When mounting the slit body 35 onto the upper panel 30a, the boss 35d is first inserted into the mounting depression 45. Then, the orientation of the slit body 35 is adjusted by rotating the slit body 35 while pressing a jig against the base 35c. The slit body 35 is rotated about the boss 45 within a predetermined angle that the distance of the slit 44 from the cylindrical lens 22 falls in a so-called focal depth range that the laser beam L is focused on the slit 44. The slit 44 can therefore be positioned to receive a laser beam that travels along its optical axis that extends on or adjacent to the approximate center of the boss 35d. In other words, the rotational adjustment allows the slit 44 to be positioned to receive a laser beam travelling along its optical axis that is substantially aligned with, or displaced by a slight distance, but still in approximately parallel with the optical axis of the condenser lens 36.

Thus, this rotation of the slit body 35 adjusts the slit 44 in a direction substantially orthogonal to the optical axis of the laser beam L, thereby adjusting the timing at which the laser beam L falls incident on the photosensor 26 and the photosensor 26 produces the detection signal. The above-described rotating adjustment can move the slit 44 across a broad range in the direction orthogonal to the optical axis of the incident laser beam, through rotating the slit body 35 by a small rotation angle. A small space is sufficient for rotating the slit body 35, in comparison with moving the slit body 35 entirely in the direction orthogonal to the optical axis of the incident laser beam. Because thus rotating the slit body 35 by the small rotation angle can prevent the slit 44 from shifting from the focal depth region, it is possible to efficiently introduce the laser beam L through the slit 44 to the condenser lens 36.

After the slit body 35 is thus properly oriented, the boss 35d or the base 35c of the slit body 35 can be fixed to the inner surface of the upper panel 30a using adhesive.

In the drawings, the slit body 35 is oriented so that the slit 44 is positioned upstream from the boss 35d, in terms of the incident laser beam L. However, the slit body 35 can be oriented so that the slit 44 is positioned downstream from the boss 35d, as long as the slit 44 is positioned in the focal depth range of the cylindrical lens 22.

According to the present embodiment, as shown in FIG. 5, a protrusion 46 is provided to the inner surface of the encasing wall 30b near the light-obstructing wall 35b of the slit body 35. The protrusion 46 extends in a direction parallel to the direction in which the slit 44 extends. The protrusion 46 will scatter the laser beam L from the beam detector mirror 25 that approaches the inner wall of the encasing wall 30b and that passes through by the slit body 35 unobstructed by the light-obstructing wall 35b. Therefore, light of the laser beam L that passes by the slit body 35 in this manner will not fall directly incident on the condenser lens 36 and so will not be mistakenly detected as a write start beam detection signal.

Figure 9:
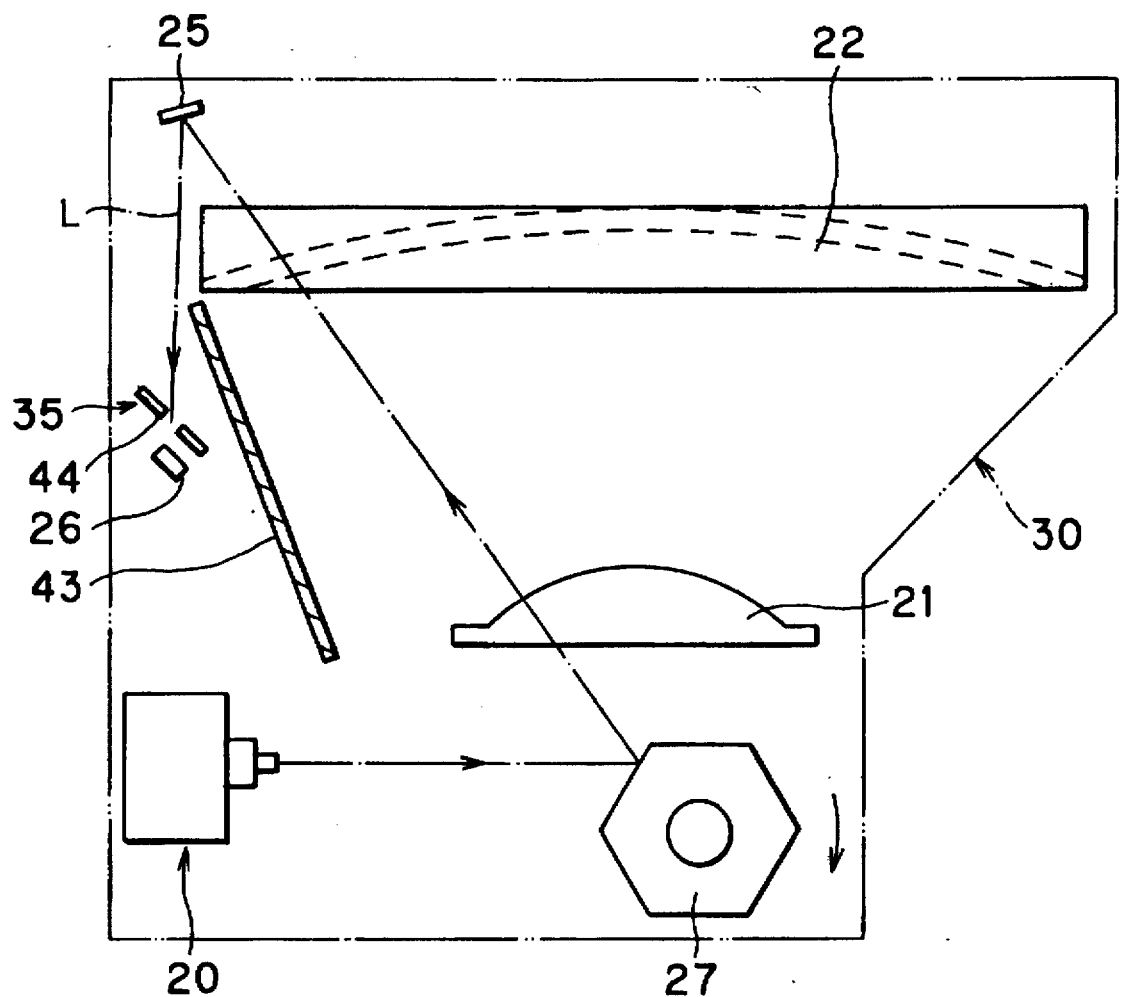
FIG. 9 is a plan view of a modification of the present embodiment.

In a modification shown in FIG. 9, the light receiving surface of the beam detector sensor 26 is oriented at a slant of an appropriate angle to the optical axis of the laser beam L. In this way, light reflected off the light reception surface of the beam detector sensor 26 can be prevented from returning directly to the beam detector mirror 25.

When the sensor 26 produces an electric beam detection signal as described above, the laser drive board 37 receives and processes the electric signal as a horizontal synchronization signal (horizontal scan start timing signal), and outputs the electric signal to the external control device (not shown). The external control device controls the laser drive unit 20 in accordance with the horizontal synchronizing signal via the printed circuit board 29.

Figure 7:
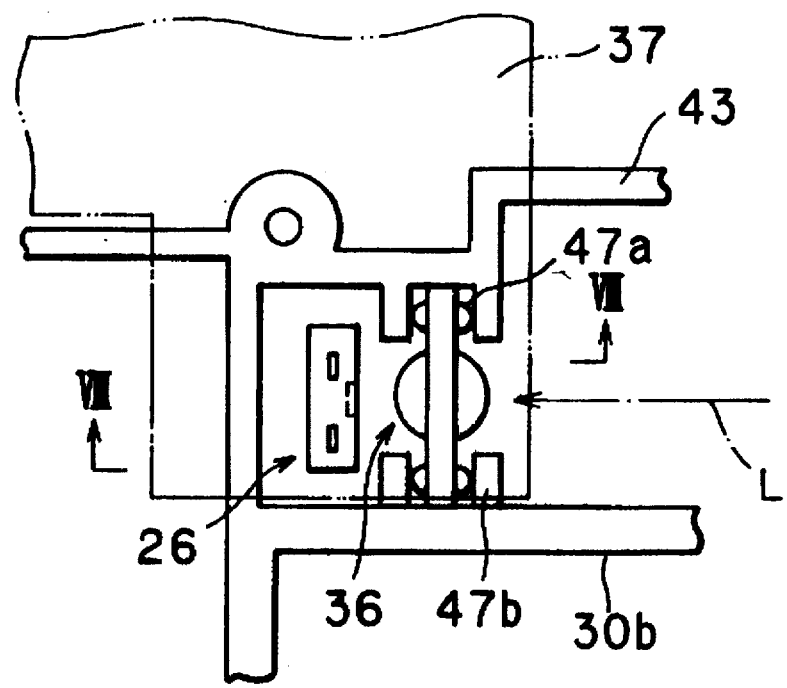
FIG. 7 is an enlarged plan view showing positional relationship of a condenser lens and a detection sensor.
Figure 8:
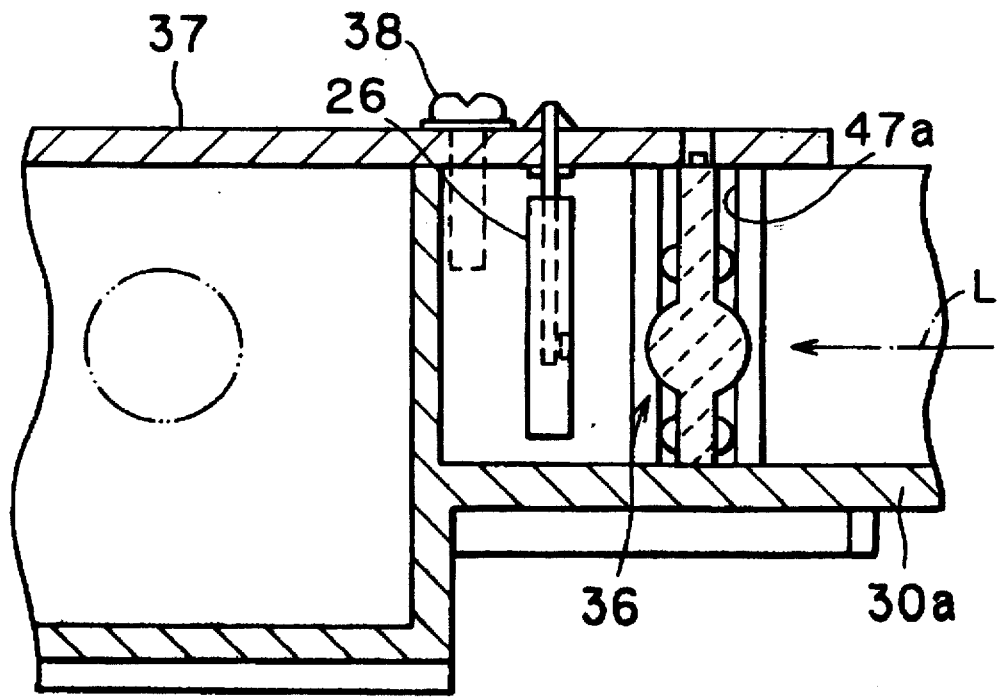
FIG. 8 is a cross-sectional view taken along line VIII—VIII of FIG. 7.

The laser drive board 37 is fixed by a screw 38 in abutment contact with the edge of a rib protruding downward from the inner surface of the upper panel 30a. As shown in FIGS. 3, 7, and 8, a pair of attachment grooves 47a and 47b are formed to the interior of the upper panel 30a and the partition wall 43 respectively substantially in a U-shape when viewed from below. The condenser lens 36 is mounted tightly to attachment grooves 47a and 47b and prevented from falling off the laser drive board 37. Legs or other portions of the beam detection sensor 26 can be fixed directly to the laser drive board 37 by soldering or other method. This makes attaching the beam detector sensor 26 easier than if the beam detector sensor 26 were mounted independently.

Alternatively, the beam detector sensor 26 or the laser generation unit 20 could be fixed to the outer side of one of the encasing side walls of the housing case 30. Also, the present invention could be applied to optical devices used in image forming processes employed in facsimile machines, copiers, and other electrophotographic image forming devices.

As described above, in the optical beam scanning device of the present invention, the light source emits a laser beam. The deflection unit deflects the laser beam to irradiate the image forming surface in horizontal scans. The beam detection mirror reflects the laser beam at a start of each horizontal scan. The slit body has a slit oriented so the laser beam passes therethrough after being reflected off the mirror. The sensor is disposed so that the laser beam falls incident thereon after passing through the slit. According to the present invention, a light-obstructing wall of the slit body is slanted an appropriate angle with regards to an optical axis of the laser beam from the beam detection mirror. When reflected at the surface of the light-obstructing wall, the laser beam will not directly return to the beam detection mirror and then to the deflection unit. Accordingly, any ghost images will not be formed on the image forming surface. A high quality image will be formed on the image forming surface.

The deflection unit, the slit body, and the sensor are entirely mounted in the housing case. According to the present invention, the partition wall is provided for separating the optical path from the deflection unit to the beam detection mirror and the optical path from the beam detection mirror to the slit body. Therefore, even if the optical path of the laser beam emitted toward the image forming surface in the vicinity of the beam detection mirror is substantially parallel to the optical path of the laser beam emitted toward the beam detection mirror, the laser beam emitted to fall incident on the image forming surface is blocked by the partition wall so that the write start timing is stably detected even if the laser beam is scattered by the inner surface of the housing case. Providing the partition wall allows positioning the beam detection mirror and the sensor where necessary to that the optical path of light from the deflection unit to the image forming surface in the vicinity of the beam detection mirror can be set substantially parallel to the optical path from the mirror to the slit. This allows forming the housing case into a compact size.

The slit body is rotatably mounted so that position of the slit can be adjusted in a direction perpendicular to the optical axis of the laser beam from the beam detection mirror. Therefore, adjustment operations become extremely easy because the position can be adjusted by merely rotating the slit body around its center of rotation. There is not need to secure a large space in the housing case, because the slit body is rotated around its axis (i.e., center of rotation), which is away from the slit position, and not by moving the entire slit body.

In order to move the position of the slit in the slit body substantially normal to the optical axis of the incident laser beam, the slit body is rotated around its rotation axis within a range that allows only the optical beam that travels along an optical axis positioned adjacent to the rotational axis to fall incident on the slit. Accordingly, it is possible to reduce the amount with which the position of the slit is mistakenly shifted downstream or upstream in regards to the optical axis of the laser beam, thereby preventing light from being incident on the sensor out of focus. With this rotating adjustment, it is possible to position the slit body at a position that selectively allows the slit to receive the optical beam that travels along its optical axis that is substantially aligned with, or displaced by a slight distance, but still in parallel with a line connecting the slit and the center of rotation, i.e., the approximate center of the boss.

The protrusion is provided to the inner surface of the encasing wall so as to obstruct light which has passed between the light-obstructing wall of the slit body and the encasing wall. Therefore, even when the laser beam passes through between the slit body and the encasing wall, the laser beam is prevented by the protrusion from falling incident on the sensor. The sensor will not erroneously produce the detection signal at a timing different from the desired write start timing.

While the invention has been described in detail with reference to the specific embodiment thereof, it would be apparent to those skilled in the art that various changes and modifications may be made therein without departing from the spirit of the invention, the scope of which is defined by the attached claims.

What is claimed is:

1. An optical beam scanning device comprising:
a light source emitting a laser beam;
a deflection unit deflecting the laser beam to irradiate an image forming surface in horizontal scans;
a mirror reflecting the laser beam at a start of each horizontal scan;
a slit body having a light-obstructing wall for defining a slit oriented so the laser beam passes therethrough after being reflected off the mirror, the light-obstructing wall being slanted with regards to an optical axis of the laser beam reflected from the mirror; and
a sensor disposed so that the laser beam falls incident thereon after passing through the slit, the sensor producing a horizontal scan start timing signal upon receiving the laser beam.

2. An optical beam scanning device as claimed in claim 1 further comprising;
a housing case for encasing the deflection unit, the slit body, and the sensor; and
a partition wall provided for separating an optical path from the deflection unit to the mirror and an optical path from the mirror to the slit body.

3. An optical beam scanning device as claimed in claim 1, wherein the slit body is rotatably mounted for adjusting the position of the slit in a direction perpendicular to the optical axis of the laser beam.

4. An optical beam scanning device as claimed in claim 3, wherein the slit body is rotatably mounted with its center of rotation for selectively cause the laser beam travelling along its optical axis adjacent to the center of rotation to fall incident on the slit.

5. An optical beam scanning device as claimed in claim 2, wherein the light-obstructing wall extends toward an inner surface of an encasing wall of the housing case, a protrusion being provided to the inner surface of the encasing wall so as to obstruct light passing between the light-obstructing wall and the encasing wall.

6. An optical beam scanning device as claimed in claim 1, wherein the deflecting unit includes:
an optical beam deflector for deflecting the laser beam in the horizontal scans; and
a lens for focusing the laser beam deflected by the optical beam deflector onto the image forming surface, and
wherein the slit body is rotated so that the slit is positioned within the range where the lens focuses the laser beam reflected by the mirror.

7. An optical beam scanning device as claimed in claim 6, wherein the distance between the lens and the slit is substantially equal to the distance between the lens and the image forming surface.

8. An optical beam scanning device as claimed in claim 7, further comprising a condenser lens for collecting the laser beam, that has passed through the slit, onto the sensor.

9. An optical beam scanning device as claimed in claim 8, wherein the sensor includes:
a light receiving surface for receiving the laser beam from the condenser lens; and
an electric signal producing portion for producing a horizontal synchronizing electric signal when the light-receiving surface receives the laser beam of a predetermined amount or more.

10. An optical beam scanning device as claimed in claim 9, wherein the light receiving surface is slanted with regards to the optical axis of the laser beam.

11. An optical beam scanning device comprising:
a light source emitting a laser beam;
a deflection unit deflecting the laser beam to irradiate an image forming surface in horizontal scans;
a mirror reflecting the laser beam at a start of each horizontal scan;
a slit body having a light-obstructing wall for defining a slit oriented so the laser beam passes therethrough after being reflected off the mirror, the slit body being rotatably mounted for adjusting the position of the slit in a direction perpendicular to the optical axis of the laser beam from the mirror; and a sensor disposed so that the laser beam falls incident thereon after passing through the slit, the sensor producing a horizontal scan start timing signal upon receiving the laser beam.

12. An optical beam scanning device as claimed in claim 11, wherein the slit body is rotatably mounted with its center of rotation for selectively causing the laser beam travelling along its optical axis adjacent to the center of rotation to fall incident on the slit.

13. An optical beam scanning device as claimed in claim 11, further comprising;
    a housing case for encasing the deflection unit, the slit body, and the sensor; and
    a partition wall provided for separating an optical path from the deflection unit to the mirror and an optical path from the mirror to the slit body.

14. An optical beam scanning device as claimed in claim 11, wherein the light-obstructing wall of the slit body extends toward an inner surface of an encasing wall of the housing case, a protrusion being provided to the inner surface of the encasing wall so as to obstruct light passing between the light-obstructing wall and the encasing wall.

15. An optical beam scanning device as claimed in claim 11, wherein the deflection unit includes:
    an optical beam deflector for deflecting the laser beam in the horizontal scans; and
    a lens for focusing the laser beam deflected by the optical beam deflector onto the image forming surface, and
    wherein the slit body is rotated so that the slit is positioned within the range where the lens focuses the laser beam reflected by the mirror.

16. An optical beam scanning device as claimed in claim 15, wherein the distance between the lens and the slit is substantially equal to the distance between the lens and the image forming surface.

17. An optical beam scanning device as claimed in claim 16, further comprising a condenser lens for collecting the laser beam, that has passed through the slit, onto the sensor.

18. An optical beam scanning device as claimed in claim 17, wherein the sensor includes:
    a light receiving surface for receiving the laser beam from the condenser lens; and
    an electric signal producing portion for producing a horizontal synchronizing electric signal when the light-receiving surface receives the laser beam of a predetermined amount or more.

19. An optical beam scanning device as claimed in claim 18, wherein the light receiving surface is slanted with regards to the optical axis of the laser beam.

* * * * *